United States Patent
Gupta

(10) Patent No.: US 12,165,040 B2
(45) Date of Patent: Dec. 10, 2024

(54) NEURAL NETWORK LEARNING FOR THE PREVENTION OF FALSE POSITIVE AUTHORIZATIONS

(71) Applicant: Mastercard International Incorporated

(72) Inventor: Ashutosh Gupta, Purchase, NY (US)

(73) Assignee: Mastercard International Incorporated, Purchase, NY (US)

( * ) Notice: Subject to any disclaimer, the term of this patent is extended or adjusted under 35 U.S.C. 154(b) by 218 days.

(21) Appl. No.: 17/705,129

(22) Filed: Mar. 25, 2022

(65) Prior Publication Data

US 2022/0215238 A1 Jul. 7, 2022

Related U.S. Application Data

(63) Continuation of application No. 16/680,185, filed on Nov. 11, 2019, now Pat. No. 11,288,571, which is a continuation of application No. 15/332,081, filed on Oct. 24, 2016, now Pat. No. 10,509,997.

(51) Int. Cl.
*G06N 3/063* (2023.01)
*G06N 3/10* (2006.01)

(52) U.S. Cl.
CPC .............. *G06N 3/063* (2013.01); *G06N 3/10* (2013.01)

(58) Field of Classification Search
CPC ................................. G06N 3/10; G06N 3/063
See application file for complete search history.

(56) References Cited

U.S. PATENT DOCUMENTS

| | | | |
|---|---|---|---|
| 6,330,546 B1 | 12/2001 | Gopinathan et al. | |
| 7,686,214 B1 * | 3/2010 | Shao | G06Q 40/03 235/382 |
| 8,065,233 B2 * | 11/2011 | Lee | G06Q 20/10 705/76 |
| 9,185,095 B1 * | 11/2015 | Moritz | H04L 63/0861 |
| 10,509,997 B1 * | 12/2019 | Gupta | G06Q 10/00 |
| 11,288,571 B1 * | 3/2022 | Gupta | G06N 3/08 |
| 2002/0099649 A1 * | 7/2002 | Lee | G06Q 20/4016 705/38 |
| 2004/0098339 A1 * | 5/2004 | Malek | G06Q 30/02 705/44 |
| 2007/0000999 A1 | 1/2007 | Kubo et al. | |
| 2007/0288641 A1 | 12/2007 | Lee et al. | |
| 2010/0274691 A1 | 10/2010 | Hammad et al. | |

(Continued)

OTHER PUBLICATIONS

Ghosh, Sushmito, and Douglas L. Reilly. "Credit card fraud detection with a neural-network." System Sciences, 1994. Proceedings of the Twenty-Seventh Hawaii International Conference on. vol. 3. IEEE, 1994. (Year: 1994).*

(Continued)

*Primary Examiner* — Randall K. Baldwin
(74) *Attorney, Agent, or Firm* — FOLEY & LARDNER LLP

(57) ABSTRACT

Disclosed herein are systems and methods that identify and improve upon false positive scores. Some embodiments may include artificial neural network learning methods that utilize data input from users as well as enterprise machines. Information, such as transaction timing, prior transaction data, and demographics, may be taken as inputs to the neural network processing. The processing may be done on one or more neural network computers or nodes.

14 Claims, 3 Drawing Sheets

(56) References Cited

U.S. PATENT DOCUMENTS

| | | |
|---|---|---|
| 2010/0305993 A1 | 12/2010 | Fisher |
| 2011/0282789 A1 | 11/2011 | Carroll et al. |
| 2013/0018795 A1* | 1/2013 | Kolhatkar ............ G06Q 20/4016 |
| | | 705/44 |
| 2013/0024358 A1 | 1/2013 | Choudhuri et al. |
| 2013/0197998 A1 | 8/2013 | Buhrmann et al. |
| 2014/0180974 A1 | 6/2014 | Kennel et al. |
| 2014/0201084 A1* | 7/2014 | Dagenais ............. G06Q 20/382 |
| | | 705/64 |
| 2014/0279309 A1* | 9/2014 | Cowen ............... G06Q 20/4016 |
| | | 705/30 |
| 2014/0324699 A1* | 10/2014 | Ding .................. G06Q 20/4016 |
| | | 705/44 |
| 2014/0351137 A1* | 11/2014 | Chisholm ............. G06Q 20/40 |
| | | 705/44 |
| 2015/0142713 A1 | 5/2015 | Gopinathan et al. |
| 2015/0227935 A1* | 8/2015 | Adjaoute ............... G06F 21/60 |
| | | 705/44 |
| 2015/0254330 A1 | 9/2015 | Chan et al. |
| 2015/0331875 A1 | 11/2015 | Regidi et al. |
| 2015/0339772 A1 | 11/2015 | Hubbard |
| 2016/0065671 A1 | 3/2016 | Nallathambi et al. |
| 2016/0086185 A1* | 3/2016 | Adjaoute ........... G06Q 20/4016 |
| | | 705/44 |
| 2016/0253656 A1* | 9/2016 | Dragushan ......... G06Q 30/0207 |
| | | 705/71 |
| 2018/0053114 A1* | 2/2018 | Adjaoute ............... G06N 20/00 |
| 2018/0068395 A1* | 3/2018 | Gupta ..................... G06N 3/08 |
| 2018/0300730 A1* | 10/2018 | Telford-Reed ...... H04W 12/126 |

OTHER PUBLICATIONS

Quah, Jon TS, and M. Sriganesh. "Real-time credit card fraud detection using computational intelligence." Expert systems with applications 35.4 (2008): 1721-1732. (Year: 2008).*

Xiao, Fu, Shi Jin, and Xie Li. "A novel data mining-based method for alert reduction and analysis." Journal of networks 5.1 (2010): 88-97. (Year: 2010).*

Ryman-Tubb, Nick F., and Artur d'Avila Garcez. "Soar—sparse oracle-based adaptive rule extraction: knowledge extraction from large-scale datasets to detect credit card fraud." The 2010 International Joint Conference on Neural Networks (IJCNN). IEEE, 2010. (Year: 2010).*

Mishra, Mukesh Kumar, and Rajashree Dash. "A comparative study of chebyshev functional link artificial neural network, multi-layer perceptron and decision tree for credit card fraud detection." 2014 International Conference on Information Technology. IEEE, 2014: 228-233 (Year: 2014).*

Behera, Tanmay Kumar, and Suvasini Panigrahi. "Credit card fraud detection: a hybrid approach using fuzzy clustering & neural network." 2015 second international conference on advances in computing and communication engineering. IEEE, 2015: 494-499. (Year: 2015).*

Srivastava, Aman, et al. "Credit card fraud detection at merchant side using neural networks." 2016 3rd International Conference on Computing for Sustainable Global Development (INDIACom). IEEE, Mar. 2016: 667-670 (Year: 2016).*

Fausett, "Fundamentals of Neural Networks: Architectures, Algorithms, and Applications", 2004, Pearson Education, Delhi, India (476 pages).

Xiao et al., "A Novel Data Mining-Based Method for Alert Reduction and Analysis", Journal of Networks, vol. 5, No. 1, Jan. 2010, pp. 88-97 (10 pages).

* cited by examiner

NEURAL NETWORK LEARNING FOR THE PREVENTION OF FALSE POSITIVE AUTHORIZATIONS

CROSS-REFERENCE TO RELATED APPLICATIONS

This application is a continuation application of U.S. patent application Ser. No. 16/680,185, filed Nov. 11, 2019, issued as U.S. Pat. No. 11,288,571, which is a continuation application of U.S. patent application Ser. No. 15/332,081, filed Oct. 24, 2016, issued as U.S. Pat. No. 10,509,997 each of which is incorporated by reference in its entirety.

TECHNICAL FIELD

This application relates generally information systems and specifically to dynamically generating and manipulating datasets associated with analytics processing.

BACKGROUND

Artificial computer neural networks are able to learn from themselves by repeatedly running a set of instructions or algorithm, and learning each time from the previous results. Computer networks which are used by financial institutions can have and maintain these elaborate artificial neural network schemes in order to track billions of transactions every hour. These learning systems may improve upon themselves in order to protect identities as well as preserve truthful transactions.

Enterprise systems frequently utilize rules and rules engines to determine which transactions to allow. For example, a consumer using a payment card may attempt to make a legitimate transaction in person or online. An attempt may similarly be made in a fraudulent manner with a user using an illegitimate or stolen payment card. Enterprise and banking systems may devise their rules such as to prevent these transactions. In order to prevent these transactions, however, a system must be implemented to detect who and when one may use an authorized payment method. Laurene Fausett's Fundamentals of Neural Networks Architectures, Algorithms and Applications, published by Pearson Education in 2004, and incorporated by reference, includes examples of systems known in the art.

In some systems which are overly cautious, one out of ten detected transactions may be fraud while the other nine are valid transactions. This system may frustrate users with repeated authorization requests or denied transactions. There is a need, therefore, for better identification of false positives, as well as improved rules systems' mechanisms.

SUMMARY

Disclosed herein are systems and methods capable of addressing the above-described shortcomings and may also provide any number of additional or alternative benefits and advantages. For example, the embodiments described herein may include an Artificial Neural Network (ANN) for the prevention of false positives, a situation where a transaction has been determined to be a fraud and so the transaction is declined, but the transaction is not in fact fraudulent. The ANN may receive information at an artificial neural network node from a user terminal when a transaction is declined regarding the user's account, retrieve information from an enterprise terminal regarding the user's financial profile, perform neural network learning based on information associated for the user including calculating a false positive score, and submit the false positive score to the enterprise terminal.

The systems and methods described herein attempt to better determine when a false decline transaction occurs. When a transaction is declined, the systems and methods identify a similar transaction on another card that may have been initiated by the same person. The determinations can use the following data: transactions at same merchant after the decline, a time difference between the decline and the subsequent transactions, an amount difference between the decline transaction and subsequent transactions, a channel of declined transaction and subsequent transactions, demographic information of the users associated with the card numbers making subsequent transactions and the users associated with the card number of the declined transaction (e.g., age, income, number of children, gender), and a comparison of the profile of the card that made the declined transaction and the cards making the subsequent transaction.

The method may include the steps of matching authorization data and clearing data, analyzing declined and subsequent approved transactions, receiving input about false positive data from an issuer, using an output of the analysis of declined and subsequent approved transactions as an input to a neural network, and generating a false positive decline score.

In one embodiment, a method of machine learning in an ANN for the prevention of false positives, the method comprises, upon receiving an indication that a transaction has been declined, receiving, by an ANN server, demographic information from a terminal about a user associated with the user account in the transaction; retrieving, by the ANN server, information from an enterprise terminal regarding the user's profile, wherein the information represents transaction history of the user; updating, by the ANN server, values on each neural network node based on demographic information from the user terminal and transaction history information from the enterprise terminal; upon updating the values on the neural network node, generating, by the ANN server, a false positive score based on a weighting of the values on each neural network node; and transmitting, by the ANN server, the false positive score to the enterprise terminal configured to display a graphical user interface populated with the false positive score.

In another embodiment, a server configured for machine learning in an ANN for the prevention of false positives, the server comprises a memory; and a processor configured to: upon receiving an indication that a transaction has been declined, receive demographic information from a terminal about a user associated with the user account in the transaction; retrieve information from an enterprise terminal regarding the user's profile, wherein the information represents transaction history of the user; update values on each neural network node based on demographic information from the user terminal and transaction history information from the enterprise terminal; upon updating the values on the neural network node, generate a false positive score based on a weighting of the values on each neural network node; and transmit the false positive score to the enterprise terminal configured to display a graphical user interface populated with the false positive score.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Figure 1:
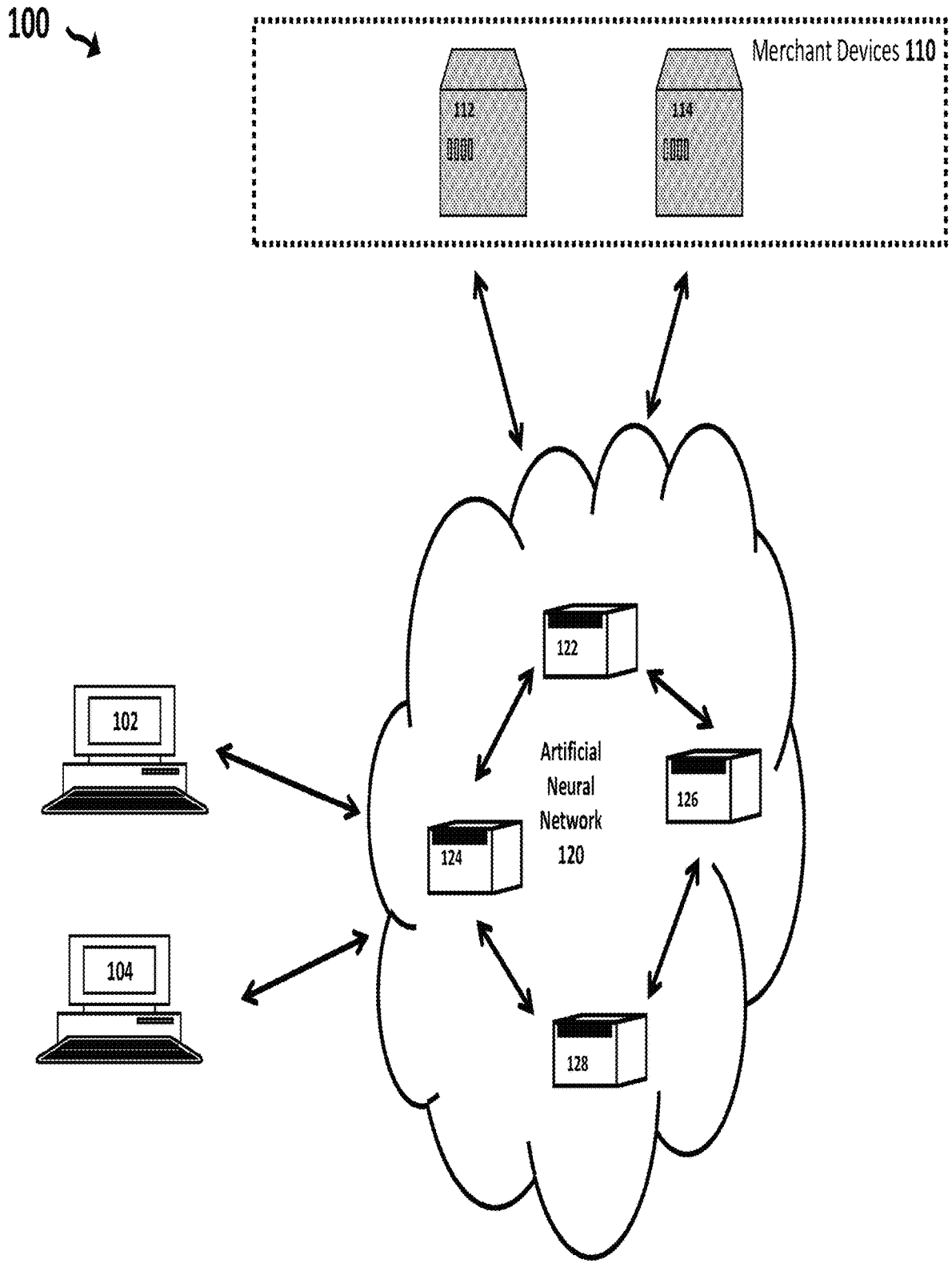
FIG. 1 illustrates components of an exemplary system, according to an exemplary embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

The embodiments described herein provide systems and methods for creating dynamic rules systems which use neural networks to improve and identify false positives more accurately.

System Diagram

FIG. 1 illustrates components of an exemplary system 100, according to an exemplary embodiment. Exemplary system 100 may include user point of sale (POS) terminals 102, 104, merchant devices 110, and Artificial Neural Network (ANN) 120.

POS terminals 102, 104 may be a physical location for use in-person or an online terminal or vendor. POS terminals 102, 104 may be a computer, a laptop, a contact or contactless payment card reader, a web server, an automated teller machine (ATM), or the like. POS terminals 102, 104 may communicate various types of data inputs and outputs with nodes of the ANN 120. The inputs and outputs might include transaction data, payment data, entity data, database records, and/or instructions and parameters for generating datasets and conducting analytics.

In operation, the ANN 120 may receive payment and/or other data from POS terminals 102, 104 after consumers purchase products or services with a payment instrument (e.g., credit card, debit card, prepaid card) and that payment method is rejected as fraudulent.

ANN 120 may include neural network nodes 122-128. ANN 120 may be at least one server that comprises nodes 122-128, where nodes 122-128 are applications or modules that are executed by one of the ANN servers. When referring to ANN 120 herein, the example embodiment is configured as an ANN server that executes each of the nodes 122-128, though it is intended that any number of servers or nodes can be utilized. ANN 120 is illustrated with nodes 122-128, though any number and configuration of neural network nodes may be utilized. Nodes 122-128 may comprise one or more separate applications or modules executed on one or more terminals or network devices. Alternatively, a single network device, e.g., an ANN server, may comprise all nodes 122-128. In one example, nodes 122-128 may each represent a separate instantiation of a virtual machine on the same server. In some instances, nodes 122-128 represent what is commonly referred to as hidden nodes in a neural network, where POS terminals 102, 104 provide input, and outputs are provided to merchant devices 110. In another example, nodes 122-128 are hidden nodes while receiving inputs from POS terminals 102, 104 and merchant devices 110, and outputting to POS terminals 102, 104.

ANN 120 may include any known or anticipated neural network topology or connections. In this example, ANN 120 is illustrated as a ring topology. In the illustrated ring topology, messages may be passed from a node to an adjacent node around the ring. In this ring network, each node may contain some memory (e.g., data values) that contributes to the neural network. Each node may store or maintain certain information that is different from other nodes. In this way, each node may contribute to the neural network in a comprehensive and machine learning methodology. Additional examples of node topologies include mesh, star, fully connected, line, tree, etc.

The ANN can learn from the updated variables and data stored in and shared by each node. In one example, a user may attempt an online transaction using POS terminal 104. A payment transaction server, e.g., merchant device 110, rejects the transaction as being fraudulent. The rejection of the transaction causes data to be transmitted to ANN 120 from POS 104. The data may include a kind of terminal used, the time of the transaction, and the amount of the transaction. At the same time, ANN 120 may receive information from merchant devices 110, such as profile information of the user, which may be stored on merchant devices 110. Profile information may include usage data and habits of a user, such as frequency of payment card use, types of payment card use (e.g., online, brick-and-mortar store use), types of purchases made, and spending habits of the user. Using these inputs, ANN 120 may utilize nodes 122-128 to output a score indicating likelihood of another fraudulent transaction.

In some instances, the different applications or modules of nodes 122-128 may be weighted using merchant rules and preferences, accounting for each factor differently. For example, demographics may be weighted 20%, time difference between transactions 20%, dollar amount difference between declined and subsequent transactions 20%, and profile information 40%. It should be appreciated that any percentage may be given to different factors and that additional factors will be considered by one skilled in the art.

ANN 120 may include an architecture that weighs the variables incoming from the data sources. ANN 120 may include activity rules on different time scales. There may be a feedback loop for certain time scales. For example, on a shorter time scale of seconds or minutes, ANN 120 may interact with merchant devices 110 indicating an immediate transactions failure or success. Further, on a larger time scale, ANN 120 may signal to merchant devices 110 that a false positive score is being output whether low or high, so that merchant devices 110 may store this for future use days or months later.

ANN 120 may also use learning rules internal to the ANN. The learning rules may specify how the weights may change over time or as certain events occur. This may be interactive with merchant devices 110 as well. For example, some rules may be internal to the ANN 120, while some others may be input and feedback from merchant devices 110. The learning rules may be dependent on activities of the nodes, occurring as a response to inputs from merchant devices 110 or POS terminals 102, 104. Target values may also be supplied by merchant devices 110 with or without thresholds.

Merchant devices 110 may include one or more merchant devices, such as exemplary merchant devices 112, 114.

Exemplary merchant device 112, 114 may be a server hosted by a bank or financial institution who manages the account for which a transaction is going to be made. For example, exemplary merchant device 112 may be a server which keeps logs of all transactions for each user or account. Exemplary merchant device 112, 114 may store its information on one or more servers and keep track in profiles. Exemplary merchant device 112, 114 may include a rules manager, a rules storage, and a policy decision engine.

Rules manager, for example, may include a graphical user interface by which merchants and/or vendors can specify rules and policies according to their needs. For example, a user may be able to specify stringent requirements on unlimited accounts so that a $100,000 purchase does not get approved without additional (e.g., secondary) verification. Rules manager may include hardware or software to define, modify, or manage rules. For example, rules manager may receive a definition of a policy from a merchant and store it in rules manager storage. Subsequently, rules manager may receive false positive information or scores and amend the rules in rules storage accordingly. A new version as well as a second version of the rules/policy may be stored thus managing version controls and enabling preservation of the history. The graphical user interface of the rules manager can be rendered on the merchant device (e.g., enterprise terminal) and populated with the false positive score transmitted from the ANN 120.

Rules manager storage may include a database or data structure used to store merchant rules. Rules manager storage may be in optical storage media, flash-memory devices, solid state devices, Read-Only Memory (ROM) or Random-Access memory (RAM). Rules manager storage may be a database configured to store the transaction data generated by the merchant Exemplary merchant device 112-114. Rules manager storage may be capable of receiving, storing, updating, and/or querying merchant transaction records of a merchant database containing the transaction data. Rules manager storage may be a logical construct of data files that are stored in non-transitory machine-readable storage media, such as a hard disk or computer memory, controlled by software modules of a database program (e.g., SQL, NoSQL, MySQL, ACCESS®, ORACLE®, IBM DB2®), and a related database management system (DBMS) that executes the code modules (e.g., SQL scripts) for various data queries and other management functions.

Flow Chart

Figure 2:
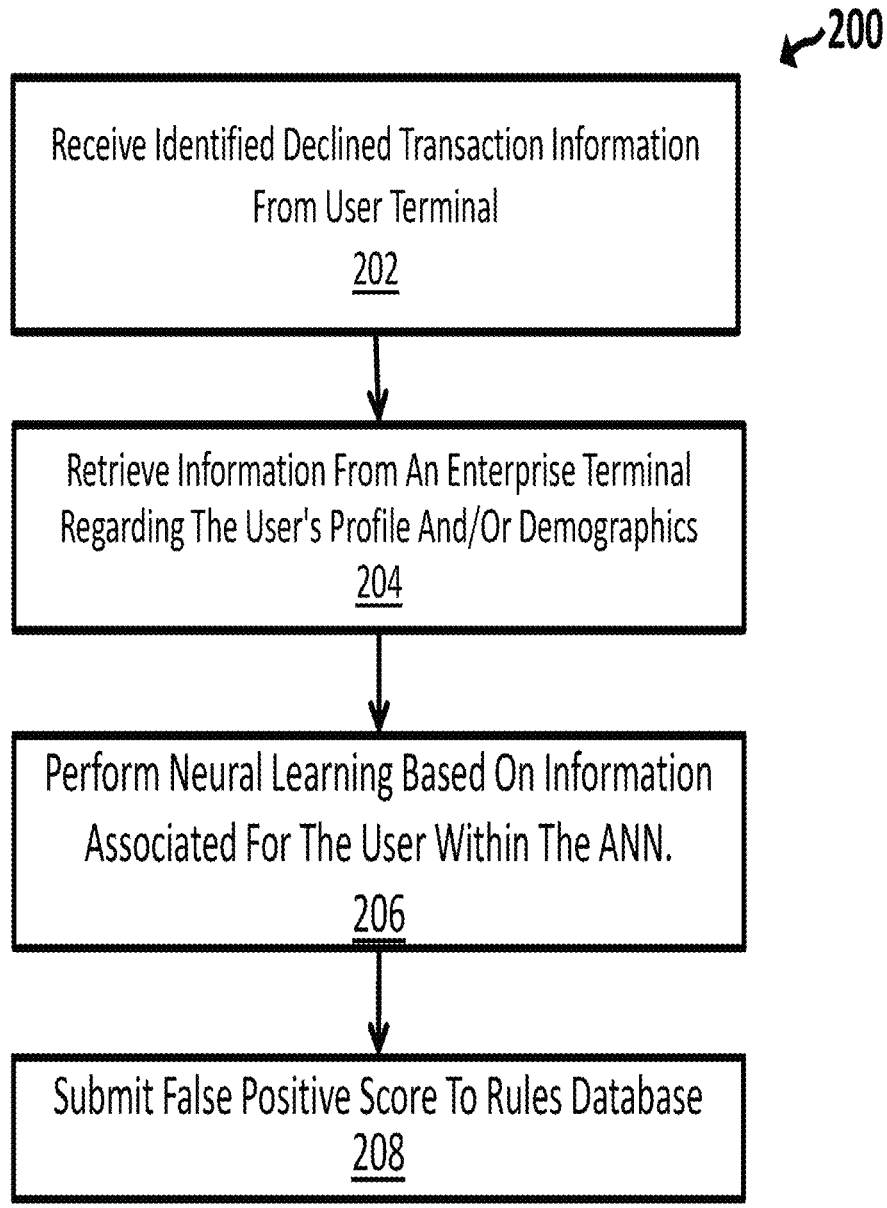
FIG. 2 shows execution of a method of identifying false positives in an artificial neural network, according to an exemplary embodiment.

FIG. 2 shows execution of a method 200 of identifying false positives in an artificial neural network, according to an exemplary embodiment. The exemplary method 200 shown in FIG. 2 comprises execution steps 202, 204, 206, and 208. However, it should be appreciated that other embodiments may comprise additional or alternative execution steps, or may omit one or more steps altogether. It should also be appreciated that other embodiments may perform certain execution steps in a different order, simultaneously, or near-simultaneously.

In step 202, the ANN may receive an identified declined transaction for a user. A user at user POS 102, 104 may initiate a purchase (e.g., online or at a brick-and-mortar store) that is rejected as an attempted fraud. The ANN determines which merchant was involved in this transaction as well as what kind of merchant. For example, a user may have a history of purchasing from a certain clothing vendor or frequently use one card for clothing. Similarly, merchant types may be categorized as travel, online services, jewelry, furniture, or home goods. For example, if a user frequently purchases from an online marketplace, then the ANN may mark the merchant as a common merchant or categorize according to a merchant type. As such, the ANN may utilize whether a prior or subsequent transaction is made at the same or similar merchant.

In addition to merchant type, channel of purchase may be used to improve the false positive values in the ANN. For example, channel may be categorized as online (e.g., card not present) or in-person (e.g., card present). If a user may use a different card with another user's name at an in-person terminal, this may indicate that a false transaction is taking place. In one example, a purchase at a large retailer can be determined to be a card present transaction. In this example, the user may not subsequently request a card not present transaction online within a few minutes. This may indicate a false transaction, which can be detected by the ANN.

In step 204, the ANN may retrieve information from an issuer or enterprise terminal regarding a user's profile. Information retrieved from the enterprise terminal (e.g., merchant device 112 shown in FIG. 1) may include profile and/or demographics information. Some or all of this information may similarly be retrieved from user POS terminals 102, 104. This information may be retrieved via a wired or wireless network connection between ANN 120 and merchant devices 110.

Demographic information may include data regarding which payment card or account numbers are making subsequent transactions and the payment card or account numbers of declined transactions. Demographic information may include age, income, number of children, gender, etc. Demographic information may be retrieved via third party access, such as through a credit reporting server. For example, if two cards have the same name and account number, but other demographics information is different, it may be indicative of a fraudulent transaction. For example, if a card for John Doe is used, where John Doe has two children in one transaction, and John Doe's card is used in another transaction but he appears to suddenly have five children, then this may indicate that a fraudulent account number or payment card is being used. Similarly, if Jane Doe is 32 years old in a declined transaction, and Jane Doe's demographic information indicates she is 55 years old in a subsequent transaction, this may also indicate a possible fraudulent transaction. However, if Jane Doe's age, income, gender, and number of children are all consistent between one transaction and the subsequent transaction, this may indicate that a non-fraudulent transaction has occurred.

The profile of the user may include data or information on how the user of the account has historically conducted transactions. For example, the account of a person who does not typically spend a lot may be considered compromised if the account is suddenly initiated with many purchases. Profile information may include, for example, frequency, timing, and common amounts of spending. A purchaser who makes frequent purchases on travel may not be flagged once another travel purchase is made. However, if a user who does not use their account very much, all of a sudden makes several purchases for airline tickets at a large cost, then the subsequent purchases may be flagged as potentially fraudulent transactions. Similarly, a sudden expensive jewelry purchase may veer from typical behavior of some users. A user may have different profiles for different cards or accounts that are used. Information may be compared between different profiles. For example, one account may be a business account that is used for travel, eating, and entertainment, whereas another account may be used for all other purchases including groceries, clothes, and utilities.

In step 206, the ANN may perform neural network machine learning utilizing the information associated for the user within the ANN. In this step, the ANN may analyze declined and subsequent approved transactions. To accomplish the analysis, the ANN may access the one or more of its nodes. Any of the above parameters may be used with a threshold in comparing or analyzing the data.

In some embodiments, a false positive score may be calculated using a combination of the above factors. For example, a false positive score may be calculated according to the formula:

False Positive Score(FPS)=$\alpha+\beta1$*Same/Similar Merchant+$\beta2$*Time difference+$\beta3$*Amount difference+$\beta4$*Same/Different channel+$\beta5$*similar demographics+$\beta6$*similar profile, where the value of coefficients $\beta1$, $\beta2$, $\beta3$, $\beta4$, $\beta5$, $\beta6$ are based on assigned significances of the predicting variables to predict the probability of false positive, same/similar merchant may=0 or 1, same/different channel may=0 or 1, similar demographics may=0 or 1, and similar profile may=a score between 0 and 1 depending on similarity in profile of declined card and the card making next transaction.

In step 208, the ANN may submit a false positive score to the rules manager database. The false positive score may be transmitted to one of merchant devices 110 for display on a graphical user interface rendered on the merchant devices 110. False positive scores may be used as input for issuer rules regarding a fraud strategy, which may assist issuers to approve more transactions without significantly increasing fraud risk. The false positive score may be used in the rules manager engines on merchant device 112, 114.

Figure 3:
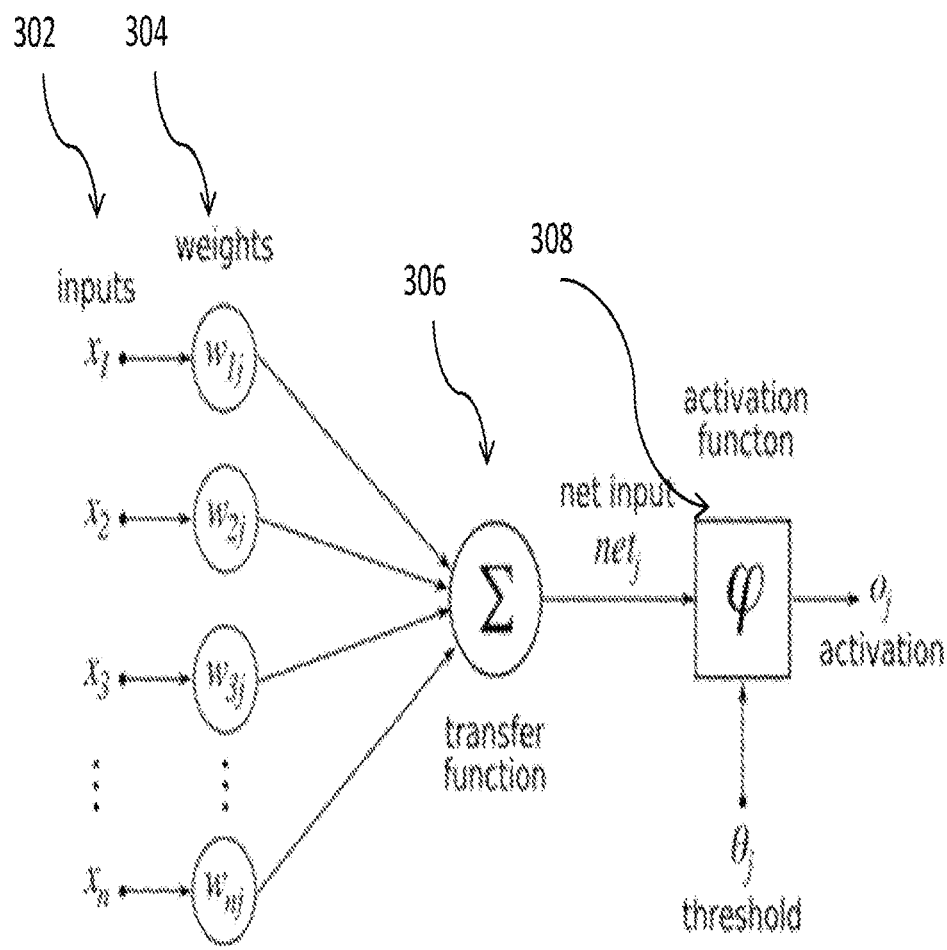
FIG. 3 illustrates an exemplary embodiment of an activation process using an activation function.

FIG. 3 illustrates an exemplary embodiment using an activation process 300. Exemplary embodiment using an activation process 300 may include inputs 302, weights 304, a transfer function 306, and an activation function 308.

Embodiment using an activation process 300 may take in inputs 302 and weigh them each accordingly using weights 304. Inputs with respect to step 204 of FIG. 2 may be used as inputs 302. For example, demographics, channel data, purchase history, etc. may be used as inputs 302. Different weights may be assigned to each of the inputs, using weights 304. Inputs 302 may be received from POS terminals 102, 104.

Inputs 302 as weighed according to weights 304 may be input into transfer function 306 which may be a summation. Transfer function 306 may be applied at a node of ANN 120, such as node 124 or node 126. Any of several activation functions such as nonlinear, continuously differentiable, a range, or monotonic may be used for activation function 308. Activation function 308 may use the output of transfer function 306 to output a false positive score using the steps outlined in method 200.

In some embodiments, a threshold or other information may be taken in from one or more of merchant devices 110. Rules implemented in merchant devices 110 may be applied and used as inputs to activation function 308 and/or transfer function 306.

In one embodiment, ANN 120 may use a node's network function $f(x)$ defined as a composition of other functions $g_i(x)$, using a nonlinear weighted sum, where $f(x)=K(\Sigma_i w_i g_i(x))$, where K is an activation function. The activation function may be nonlinear, continuously differentiable, a range, monotonic, a smooth function with a monotonic derivative, or an approximation identity near the origin, for example.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise Random Access Memory (RAM), Read Only Memory (ROM), Electrically Erasable Programmable Read-Only Memory (EEPROM), CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

I claim:

1. A method comprising:
   receiving, by a processor from an enterprise terminal when a transaction associated with a first card of a user is declined by the enterprise terminal in accordance with a calculated false positive score using one or more rules, information associated with the user comprising at least transaction history of the user;
   updating, by the processor, values of each neural network node of an artificial neural network (ANN) based on demographic information associated with the user and the transaction history received from the enterprise terminal, the ANN configured to generate a false positive score based on a weighting of updated values on each neural network node, wherein the processor uses a value of a time difference between a declined transaction and one or more subsequent transactions initiated by the user or a second user after the declined transaction using one or more cards at the enterprise terminal to update at least one value of at least one neural network;
   transmitting, by the processor to the enterprise terminal, a new version of the one or more rules based on the updated values on each neural network node, whereby the enterprise terminal executes the new version of the one or more rules for a new transaction to identify a new false positive score; and
   receiving, by the processor from the enterprise terminal, a time of the declined transaction and a transaction amount associated with the declined transaction when the transaction is declined, wherein the processor is configured to compare information associated with the first card and information associated with the one or more cards and use a result of a comparison to generate the false positive score.

2. The method of claim 1, further comprising causing, by the processor, the enterprise terminal to display a graphical user interface populated with the false positive score received from the processor.

3. The method of claim 1, further comprising determining, by the processor, one or more subsequent transactions initiated by the user or a second user after the declined transaction using one or more cards.

4. The method of claim 1, wherein the processor is configured to determine and use a value of a time difference between a declined transaction and the one or more subsequent transactions at the enterprise terminal to generate the false positive score.

5. The method of claim 1, wherein the processor is configured to determine and use a value of a difference in transaction cost between a declined transaction and the one or more subsequent transactions at the enterprise terminal to generate the false positive score.

6. The method of claim 1, wherein the processor is configured to determine whether a channel of a declined transaction and the one or more subsequent transactions at the enterprise terminal is same and use a result of the determination to generate the false positive score.

7. The method of claim 1, wherein the demographic information associated with the user comprises an age of the user, an income of the user, and a gender of the user.

8. A system comprising:
   a server comprising a processor and a non-transitory computer-readable medium containing instructions that when executed by the processor causes the processor to perform operations comprising:
   receiving, from an enterprise terminal when a transaction associated with a first card of a user is declined by the enterprise terminal in accordance with a calculated false positive score using one or more rules, information associated with the user comprising at least transaction history of the user;
   updating values of each neural network node of an artificial neural network (ANN) based on demographic information associated with the user and the transaction history received from the enterprise terminal, the ANN configured to generate a false positive score based on a weighting of updated values on each neural network node, wherein the processor uses a value of a time difference between a declined transaction and one or more subsequent transactions initiated by the user or a second user after the declined transaction using one or more cards at the enterprise terminal to update at least one value of at least one neural network;
   transmitting, to the enterprise terminal, a new version of the one or more rules based on the updated values on each neural network node, whereby the enterprise terminal executes the new version of the one or more rules for a new transaction to identify a new false positive score; and
   receiving, from the enterprise terminal, a time of the declined transaction and a transaction amount associated with the declined transaction when the transaction is declined, wherein the instructions further cause the processor to compare information associated with the first card and information associated with the one or more cards and use a result of a comparison to generate the false positive score.

9. The system of claim 8, further comprising causing, by the processor, the enterprise terminal to display a graphical user interface populated with the false positive score received from the processor.

10. The system of claim 8, further comprising determining, by the processor, one or more subsequent transactions initiated by the user or a second user after the declined transaction using one or more cards.

11. The system of claim 8, wherein the instructions further cause the processor to determine and use a value of a time difference between a declined transaction and the one or more subsequent transactions at the enterprise terminal to generate the false positive score.

12. The system of claim 8, wherein the instructions further cause the processor to determine and use a value of a difference in transaction cost between a declined transaction and the one or more subsequent transactions at the enterprise terminal to generate the false positive score.

13. The system of claim 8, wherein the instructions further cause the processor to determine whether a channel of a declined transaction and the one or more subsequent transactions at the enterprise terminal is same and use a result of the determination to generate the false positive score.

14. The system of claim 8, wherein the demographic information associated with the user comprises an age of the user, an income of the user, and a gender of the user.

* * * * *